(12) United States Patent
Seko et al.

(10) Patent No.: US 9,494,211 B2
(45) Date of Patent: Nov. 15, 2016

(54) FUEL TANK SHOCK-ABSORBING MEMBER

(71) Applicant: YACHIYO INDUSTRY CO., LTD., Sayama-shi, Saitama (JP)

(72) Inventors: Mitsuhiro Seko, Tochigi (JP); Yoshichika Taniguchi, Tochigi (JP)

(73) Assignee: YACHIYO INDUSTRY CO., LTD., Sayama-Shi (JP)

( * ) Notice: Subject to any disclaimer, the term of this patent is extended or adjusted under 35 U.S.C. 154(b) by 0 days.

(21) Appl. No.: 14/427,394

(22) PCT Filed: Nov. 29, 2013

(86) PCT No.: PCT/JP2013/082263
§ 371 (c)(1),
(2) Date: Mar. 11, 2015

(87) PCT Pub. No.: WO2014/097864
PCT Pub. Date: Jun. 26, 2014

(65) Prior Publication Data
US 2015/0240907 A1    Aug. 27, 2015

(30) Foreign Application Priority Data

Dec. 18, 2012  (JP) ................................ 2012-275589
Jul. 23, 2013  (JP) ................................ 2013-152304

(51) Int. Cl.
*F16F 15/08*    (2006.01)
*F16F 1/377*    (2006.01)
(Continued)

(52) U.S. Cl.
CPC .............. *F16F 15/08* (2013.01); *B60K 15/063* (2013.01); *B60K 15/067* (2013.01); *F16B 21/086* (2013.01); *F16F 1/377* (2013.01);
(Continued)

(58) Field of Classification Search
CPC ...... F16F 15/08; F16F 1/377; B60K 15/067; B60K 2015/0634
USPC ......... 267/139, 140, 141; 137/354; 280/834; 220/562
See application file for complete search history.

(56) References Cited

U.S. PATENT DOCUMENTS 4,765,635 A * 8/1988 Okada .................. B60K 15/067
                                                    137/354
5,467,970 A * 11/1995 Ratu ........................ B60G 7/04
                                                    267/152
(Continued)

FOREIGN PATENT DOCUMENTS

JP          5-89060       12/1993
JP          6-1817         1/1994
(Continued)

OTHER PUBLICATIONS

International Search Report, Date of mailing: Feb. 4, 2014 (Feb. 4, 2014).

*Primary Examiner* — Thomas Irvin
(74) *Attorney, Agent, or Firm* — Rankin, Hill & Clark LLP

(57) ABSTRACT

A fuel tank shock-absorbing member is provided that can be easily assembled and hardly comes off from a fuel tank. A fuel tank shock-absorbing member that is attached in a recess of a fuel tank includes a main body, a stem that extends vertically downward from the main body, and an engaging part that is formed at a distal end of the stem to have a larger diameter than that of the stem and engages in the recess. A plurality of ribs extending radially are formed on an outer circumferential surface of the engaging part.

2 Claims, 4 Drawing Sheets

(51) Int. Cl.
  *F16B 21/08* (2006.01)
  *B60K 15/067* (2006.01)
  *B60K 15/063* (2006.01)

(52) U.S. Cl.
  CPC .... *B60K2015/0634* (2013.01); *B60Y 2306/09* (2013.01); *B60Y 2400/48* (2013.01)

(56) References Cited

U.S. PATENT DOCUMENTS

| | | | | |
|---|---|---|---|---|
| 6,435,489 | B1 * | 8/2002 | Rice | F16F 1/3732 248/635 |
| 7,045,708 | B2 * | 5/2006 | Miura | F16B 21/088 174/50 |
| 7,497,290 | B2 * | 3/2009 | Marsala | B60K 15/073 180/69.1 |
| 8,205,313 | B2 * | 6/2012 | Kaneyasu | B60K 15/067 188/268 |
| 8,220,768 | B1 * | 7/2012 | Cantolino | F16F 15/08 220/565 |
| 8,220,770 | B2 * | 7/2012 | Justis | A47B 91/024 248/188.8 |
| 8,317,169 | B1 * | 11/2012 | Cantolino | F24H 9/165 248/188.8 |
| 8,505,887 | B2 * | 8/2013 | Harden | B60G 11/52 267/220 |
| 9,156,347 | B2 * | 10/2015 | Inaba | B60K 15/067 |
| 2011/0127761 | A1 * | 6/2011 | Yoshizawa | B60K 15/03177 280/834 |
| 2012/0049425 | A1 * | 3/2012 | Willis | H05K 7/142 267/141 |
| 2012/0224914 | A1 * | 9/2012 | Inaba | B60K 15/067 403/220 |

FOREIGN PATENT DOCUMENTS

| | | |
|---|---|---|
| JP | 2003-074529 | 3/2003 |
| JP | 2011-214701 | 10/2011 |

\* cited by examiner

FUEL TANK SHOCK-ABSORBING MEMBER

TECHNICAL FIELD

The present invention relates to a fuel tank shock-absorbing member installed between a fuel tank and a vehicle body.

BACKGROUND ART

For example, as shown in Patent Document 1, a technique is well known for installing a shock-absorbing member such as a rubber member between a fuel tank of a vehicle and a floor panel of a vehicle body. By installing the shock-absorbing member between the fuel tank and the floor panel, the fuel tank is prevented from striking against the floor panel, as well as vibration and noise caused by ruffles of fuel in the fuel tank, or the like, is prevented from being transmitted to the vehicle body.

However, the conventional shock-absorbing member is attached to the fuel tank with an adhesive, which reveals poor retention capability and workability. To solve this problem, for example, it can be contemplated to form a recess in the fuel tank and to arrange an engaging part that engages with the recess is provided at a distal end of the shock-absorbing member. Such a shock-absorbing member allows the shock-absorbing member to be pushed into the recess of the fuel tank for assembling in a one-touch operation.

PRIOR ART DOCUMENTS

Patent Documents

Patent Document 1: Japanese Utility Model Application Publication No. 5-89060

SUMMARY OF THE INVENTION

Problems to be Solved by the Invention

However, when the engaging part of the shock-absorbing member described above engages with the recess, an edge of the engaging part may be easily deformed to cause the shock-absorbing member to come off from the recess. In addition, when the shock-absorbing member is assembled into the recess, if airtightness is high between the recess and the engaging part, air in the recess cannot escape outside to make assembling the shock-absorbing member difficult.

The present invention aims to solve such problems and provides a fuel tank shock-absorbing member that can be easily assembled and hardly comes off from the fuel tank.

Means to Solve the Problems

To solve the problems above, the present invention provides a fuel tank shock-absorbing member that is attached to a recess of a fuel tank and includes: a main body; a stem that extends vertically downward from the main body; and an engaging part that is formed at a distal end of the stem to have a larger diameter than the stem and engages with the recess, wherein a plurality of ribs that extend radially are formed on an outer circumferential surface of the engaging part.

According to the configuration, since the plurality of ribs are formed on the outer circumferential surface of the engaging part, the engaging part can be prevented from being deformed. Accordingly, the fuel tank shock-absorbing member hardly comes off from the recess. In addition, spaces between adjacent ribs serve as ventilation ports to allow air in the recess to escape outside at the time of assembling. This improves workability in assembling the fuel tank shock-absorbing member.

In addition, the engaging part preferably includes an end surface perpendicular to the stem and one end of the rib is formed continuously from the end surface. This configuration can surely reinforce a part which may easily be deformed.

Further, a hollow part is preferably formed in a direction of an axis. This configuration allows the shock-absorbing member to be reduced in weight.

Effect of the Invention

A fuel tank shock-absorbing member according to the present invention can be easily assembled and hardly comes off from the fuel tank.

EMBODIMENTS OF THE INVENTION

Figure 1:
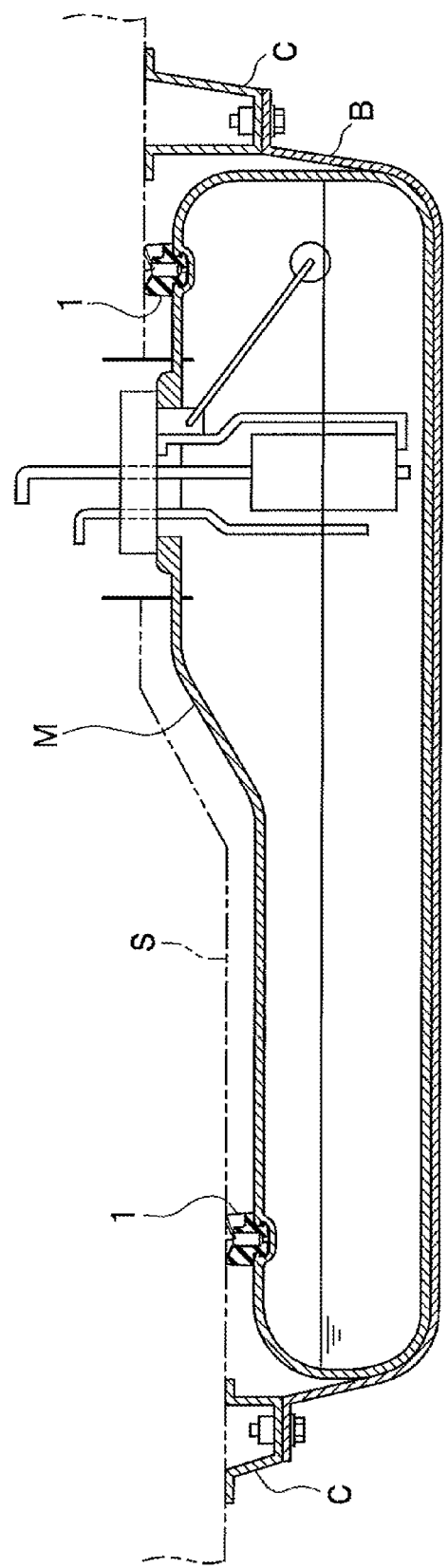
FIG. 1 is a side sectional view of an entire fuel tank and a fuel tank shock-absorbing member according to an embodiment of the present invention.

An embodiment of the present invention will be described in detail with reference to the drawings. As shown in FIG. 1, a fuel tank shock-absorbing member 1 (referred to as a "shock-absorbing member 1" hereinbelow) according to the present embodiment is a cushion member installed between a fuel tank M and a vehicle body S.

The fuel tank M is a hollow container, made of resin or metal, for storing fuel and is fixed to a bottom of the vehicle body (floor panel) S. In the present embodiment, a bottom part of the fuel tank M is supported by a tank band B having an approximately U-shape in a cross sectional view, and both ends of the tank band B are fixed to the vehicle body S via brackets C, C.

Figure 2:
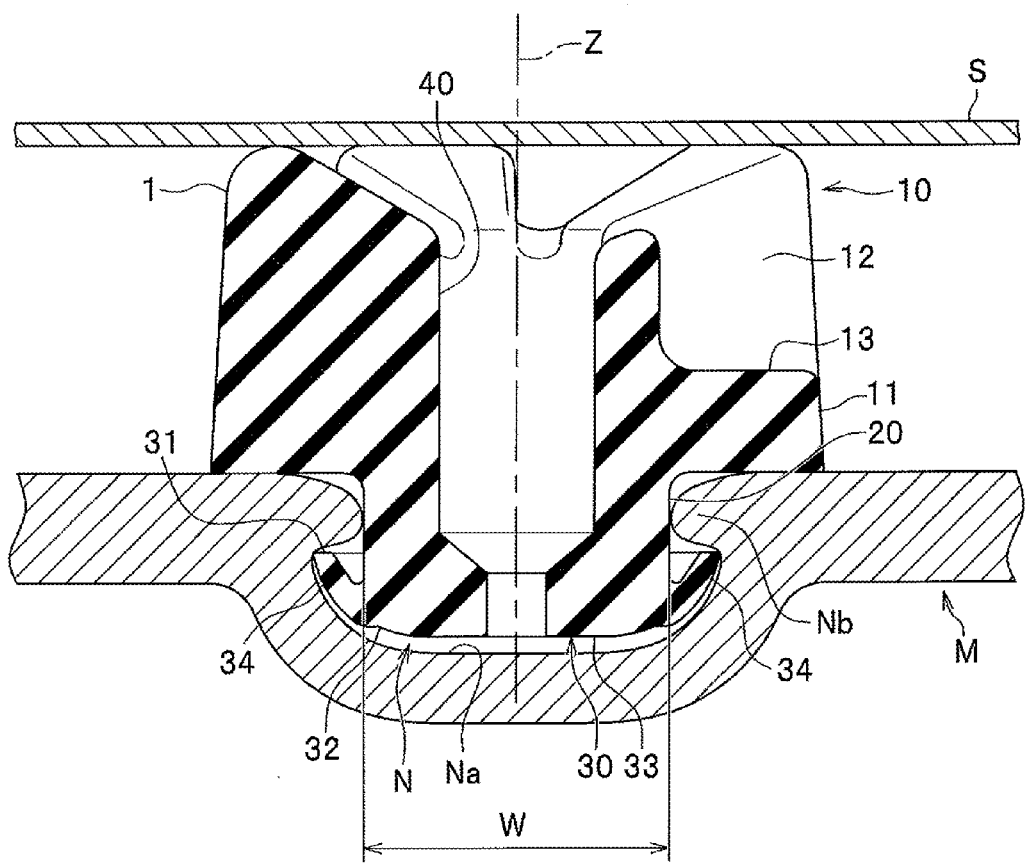
FIG. 2 is a side sectional view of the fuel tank shock-absorbing member according to the present embodiment in an attached state.

As shown in FIG. 2, a recess N is formed on a surface of the fuel tank M. The recess N is a cavity with which the shock-absorbing member 1 engages. In the present embodiment, the recess N is formed in the surface of the fuel tank M facing the vehicle body S. The recess N includes a bottom Na hollowed in a rounded shape and a plurality of projections Nb at an opening of the recess N that project toward the center of the opening. The number of projections Nb is not especially limited, yet in the present embodiment three projections are formed circumferentially at equal intervals. In the embodiment, the projections Nb are formed with a plurality of separate elements but may be formed with a continuous single element.

Figure 3:
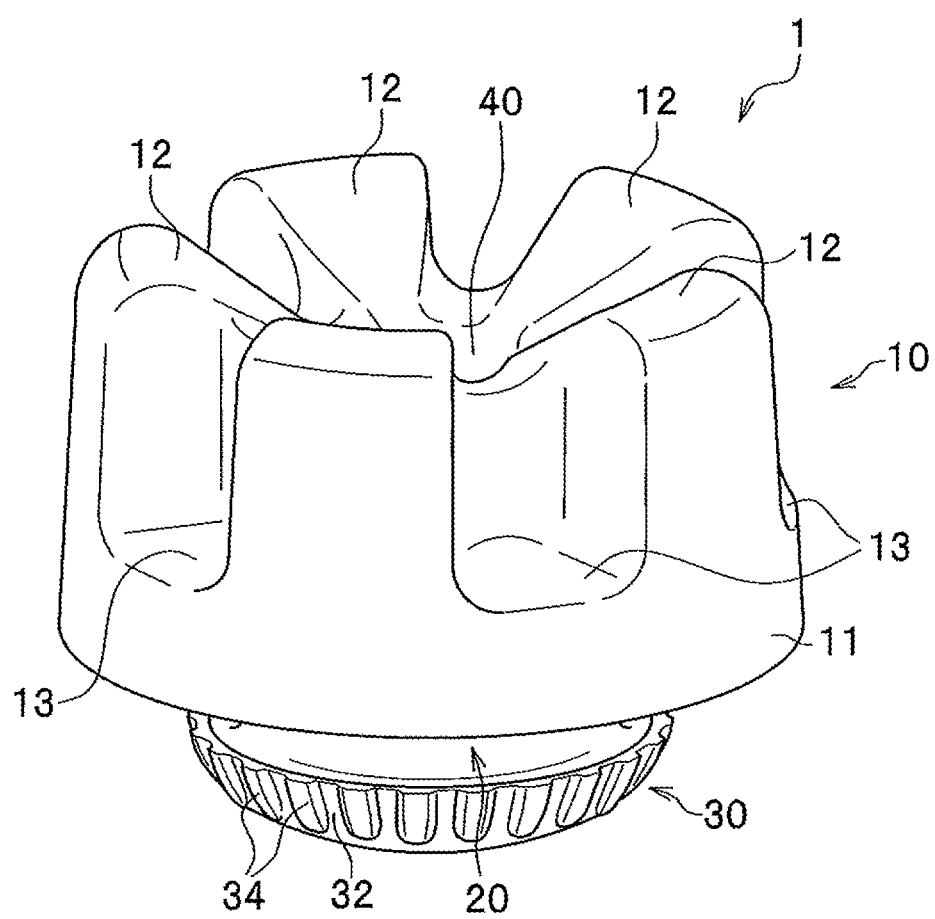
FIG. 3 is a perspective view of the fuel tank shock-absorbing member according to the present embodiment.

As shown in FIGS. 2 and 3, the shock-absorbing member 1 is a member installed between the fuel tank M and the vehicle body S. In the present embodiment, the shock-absorbing member 1 is made of rubber and is formed in a single piece. The shock-absorbing member 1 is a member that prevents the fuel tank M from striking against the vehicle body S as well as prevents vibration and noise due to ruffles of the fuel in the fuel tank, or the like, from being transmitted to the vehicle body. Note that material and a forming method of the shock-absorbing member 1 are not especially limited. The shock-absorbing member 1 may be formed with a plurality of members.

The shock-absorbing member 1 is configured to include a main body 10, a stem 20 and an engaging part 30. The main body 10 is a part that is exposed outside the fuel tank M. The main body 10 is configured to include a base 11, a plurality of convex parts 12 formed on the base 11, and a plurality of concave parts 13 formed on the base 11.

The base 11 has a ring shape. The convex parts 12 are formed on the base 11 and have an approximately triangular column shape in a planar view. The number of convex parts 12 is not especially limited, yet in the present embodiment five convex parts 12 are formed circumferentially at equal intervals. The concave parts 13 are recessed parts formed between the convex parts 12, 12. The number of concave parts 13 is not especially limited, yet five concave parts 13 are formed.

The stem 20 is a part that extends vertically downward from the main body 10 and has a cylindrical shape. As shown in FIG. 2, the stem 20 has a smaller diameter around the central axis of the main body 10 than an outer diameter of the main body 10 and has a slightly smaller diameter than an inner diameter W of the opening of the recess N. A length of the stem 20 is shorter than a thickness of the fuel tank M.

The engaging part 30 is a part that engages with the recess N. The engaging part 30 is formed to have a diameter larger than an outer diameter of the stem 20 at a proximal end and a smaller diameter as it extends toward a distal end. The engaging part 30 is configured with an upper end surface 31, an outer circumferential surface 32 and a lower end surface 33.

The upper end surface 31 is a flat surface perpendicular to the stem 20. The outer circumferential surface 32 is configured with a curved surface that has a smaller diameter as it becomes more distant from the upper end surface 31. The lower end surface 33 is in parallel with the upper end surface 31.

A plurality of ribs 34 are formed circumferentially at equal intervals on the outer circumferential surface 32. The ribs 34 are projections that extend radially on the outer circumferential surface 32 in planar view. More specifically, one end of each rib 34 is continuous to the upper end surface 31 and the other end extends to be close to the lower end surface 33. The shape of the ribs 34 is not especially limited, yet in the present embodiment each rib 34 has a widest width at the proximal end and a narrower width as it becomes more distant from the engaging part 30. Note that the ribs 34 may be formed apart from the upper end surface 31.

In addition, as shown in FIG. 2, the shock-absorbing member 1 includes a hollow part 40 formed in parallel with an axis Z. The hollow part 40 penetrates in an axial direction in the present embodiment.

As shown in FIG. 2, in a case where the shock-absorbing member 1 is assembled in the fuel tank M, a worker pushes an upper end surface of the main body 10 to insert the engaging part 30 into the recess N of the fuel tank M. This allows the engaging part 30 to be inserted into the recess N, as well as a lower end surface of the main body 10 is arranged to contact on a surface of the fuel tank M or to have a little space therebetween. Since the engaging part 30 has an outer diameter larger than the inner diameter W of the opening of the recess N, the engaging part 30 hardly comes off from the fuel tank M.

According to the shock-absorbing member 1 of the present embodiment described above, since the plurality of ribs 34 are formed on the outer circumferential surface 32 of the engaging part 30, an edge of the engaging part 30 is hardly deformed. This prevents the shock-absorbing member 1 from being come off from the recess N. More specifically, if an upward force is applied on the shock-absorbing member 1 in a state that the shock-absorbing member 1 is in engagement with the recess N, the edge of the engaging part 30 suffers bending moment toward a direction in which the edge is turned outward (in a direction of an arrow P at an end part 30a). However, in the embodiment, the ribs 34 are formed that extend radially on the outer circumferential surface 32 to resist the bending moment for preventing the deformation.

In addition, positions of the ribs 34 are not especially limited provided that the ribs 34 are formed on the outer circumferential surface 32. However, as in the present embodiment, the ribs 34 may be formed continuously from the upper end surface 31 to securely reinforce the end part 30a and the vicinity thereof that are most deformable in the engaging part 30.

Further, the ribs 34 can be arranged to reduce friction between the recess N and the engaging part 30 at the time of assembling the shock-absorbing member 1, allowing the engaging part 30 to be pushed into smoothly. Still further, at the time of assembling the shock-absorbing member 1, spaces between adjacent ribs 34 serve as ventilation ports to allow air in the recess N to easily escape outside. This makes workability to be improved in assembling the shock-absorbing member 1.

Yet further, the hollow part 40 can be arranged to reduce the shock-absorbing member 1 in weight. Also, this allows material around the axis Z to be removed to make the shock-absorbing member 1 to be easily deformed. This can further improve the workability. Furthermore, the hollow part 40 also functions as a ventilation port at the time of assembling. Note that if one pushes the main body 10 of the shock-absorbing member 1 with his thumb, the thumb may close the hollow part 40 to impair the ventilation function. However, in the present embodiment, the ribs 34 can be arranged to surely exert the ventilation function.

Figure 4A:
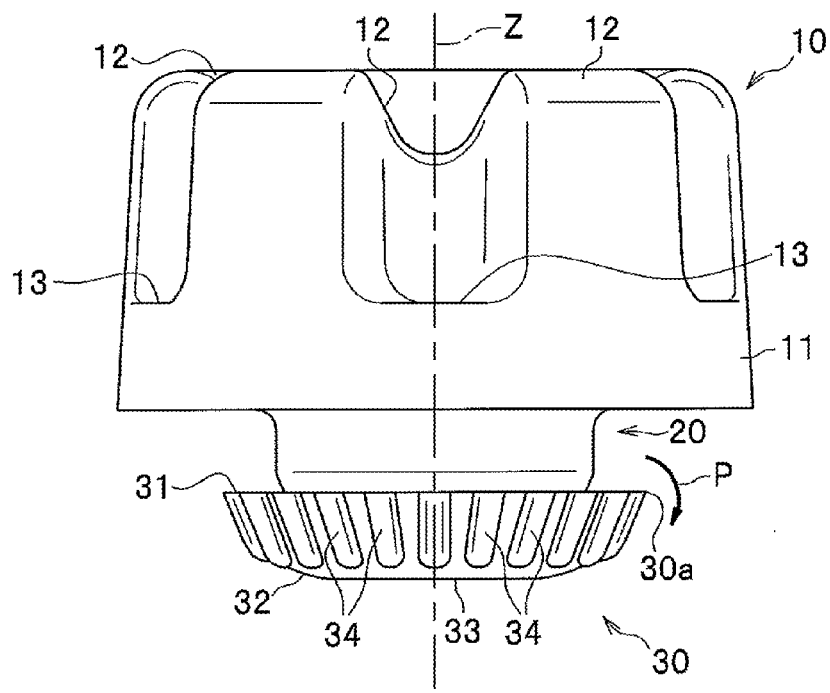
FIG. 4A is a side view and FIG. 4B is a plan view of the fuel tank shock-absorbing member according to the present embodiment.
Figure 4B:
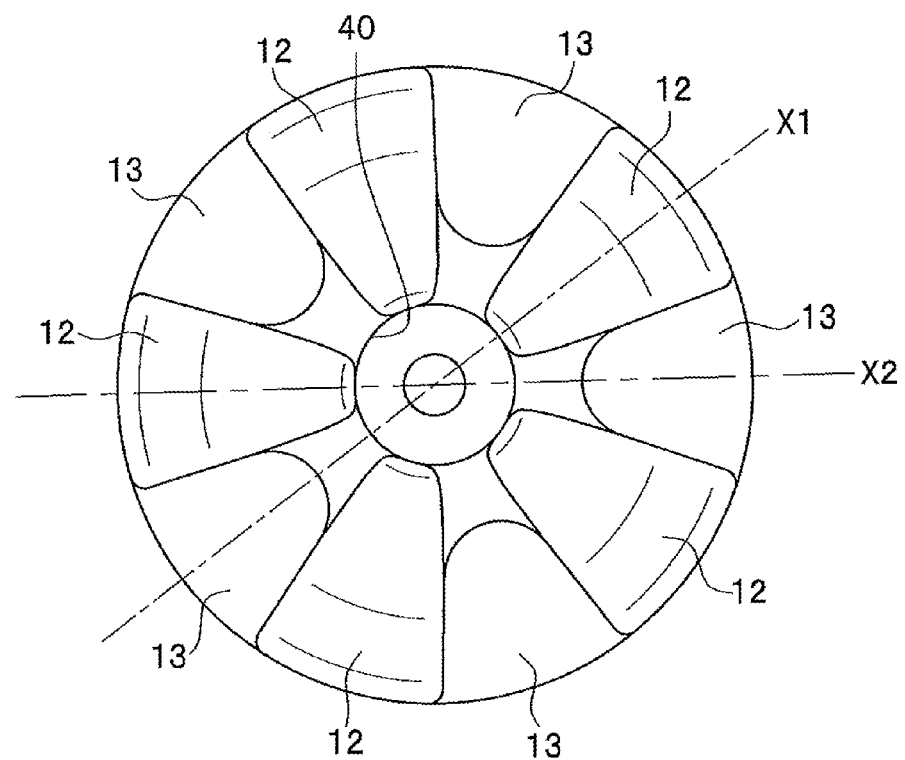

Moreover, the concave parts 13 can be arranged, although the concave parts 13 are not necessarily required, the main body 10 can be reduced in weight by providing. Also, as shown in FIG. 4B, the odd numbers of the convex parts 12 and the concave parts 13 are arranged respectively. Therefore, both a vertical section of a straight line X1 and a vertical section of a straight line X2 passing through the axis Z include one convex part 12 and one concave part 13.

If the even numbers of the convex parts 12 and the concave parts 13 are arranged at equal intervals respectively, the vertical section passing through the axis Z includes a combination of one convex part and another convex part or one concave part and another concave part. Thus, in the case where the vertical section passing through the axis Z includes a pair of convex parts or concave parts, the shapes of the vertical sections differ from each other, to cause a degree of deformation imbalanced. On the other hand, according to the present embodiment, the odd numbers of the convex parts 12 and the concave parts 13 are arranged respectively, to allow the plurality of vertical sections passing through the axis Z have the same shape, respectively, making deformation due to shear force substantially the same.

Hereinabove, the embodiment of the present invention has been described, but various design changes may be made properly without departing from the spirit of the present invention. In addition, the ribs 34 may have another shape and arrangement as far as the ventilation is allowed in the Z axis direction. Further, the hollow part 40 penetrates in the present embodiment, but can be a hollow part with a bottom.

EXPLANATION OF REFERENCES

1 shock-absorbing member
10 main body
11 base
12 convex part
13 concave part
20 stem
30 engaging part
31 upper end surface (end surface)
32 outer circumferential surface
33 lower end surface
40 hollow part
M fuel tank
N recess
Na bottom
Nb projection
S vehicle body

The invention claimed is:

1. A fuel tank shock-absorbing member that is attached to a recess of a fuel tank, comprising:

a main body;

a stem that extends vertically downward from the main body; and an engaging part that is formed at a distal end of the stem to have a larger diameter than the stem and engages with the recess, wherein an outer diameter of the engaging part is smaller than an outer diameter of the main body, an end surface substantially perpendicular to the stem is formed in a circumferential direction of the engaging part, and a hollow is formed inside the end surface in a side cross sectional view, a plurality of ribs that project from an outer circumferential surface of the engaging part and extend radially are formed on the outer circumferential surface of the engaging part, and the plurality of ribs are formed to extend from an edge of the end surface or from a position apart from the edge toward a bottom side of the engaging part.

2. The fuel tank shock-absorbing member according to claim 1, wherein a hollow part extends in a direction of an axis of the fuel tank shock-absorbing member.

* * * * *